US009246245B2

(12) United States Patent
Kawase et al.

(10) Patent No.: US 9,246,245 B2
(45) Date of Patent: Jan. 26, 2016

(54) APPARATUS FOR PROCESSING TERMINAL TREATMENT OF BRAID OF A SHIELD WIRE

(75) Inventors: Nobuhiro Kawase, Makinohara (JP); Hirofumi Hirayama, Makinohara (JP)

(73) Assignee: Yazaki Corporation, Tokyo (JP)

( * ) Notice: Subject to any disclaimer, the term of this patent is extended or adjusted under 35 U.S.C. 154(b) by 825 days.

(21) Appl. No.: 13/461,347

(22) Filed: May 1, 2012

(65) Prior Publication Data

US 2012/0210573 A1 Aug. 23, 2012

Related U.S. Application Data

(62) Division of application No. 12/457,021, filed on May 29, 2009, now Pat. No. 8,191,250.

(30) Foreign Application Priority Data

Jul. 3, 2008 (JP) ................................ 2008-174599

(51) Int. Cl.
*B23P 19/00* (2006.01)
*H01R 9/05* (2006.01)

(52) U.S. Cl.
CPC ......... *H01R 9/0509* (2013.01); *Y10T 29/49174* (2015.01); *Y10T 29/49208* (2015.01); *Y10T 29/5193* (2015.01); *Y10T 29/53209* (2015.01)

(58) Field of Classification Search
CPC ............... H01R 9/0518; H01R 9/0509; Y10T 29/53209; Y10T 29/49208; Y10T 29/5193; Y10T 29/49174
USPC .......... 29/33 M, 745, 747, 828, 867; 30/90.1; 81/9.51, 354
See application file for complete search history.

(56) References Cited

U.S. PATENT DOCUMENTS 3,044,333 A * 7/1962 Broske ........................... 30/90.1
3,153,358 A * 10/1964 Havens .......................... 81/9.51
4,719,697 A * 1/1988 Schwartzman et al. ........ 29/867
5,667,405 A 9/1997 Holliday
6,146,197 A 11/2000 Holliday et al.
6,363,604 B1 4/2002 Sakuma
6,659,140 B2 * 12/2003 Yamakawa ...................... 29/828

FOREIGN PATENT DOCUMENTS

JP 2003-257264 9/2003

* cited by examiner

*Primary Examiner* — Donghai D Nguyen
(74) *Attorney, Agent, or Firm* — Locke Lord LLP; James E. Armstrong, IV; Brian S. Matross

(57) ABSTRACT

For providing a shield wire, in which efficiency of processing terminal treatment of braid can be improved, and an apparatus for processing terminal treatment of braid, an apparatus for processing terminal treatment of braid of a shield wire includes a first hold unit holding a top of the braid covering the electric wire, a second hold unit holding a far-side of the braid, a push unit pushing the top toward the far-side so as to fold a part of braid from the top to form an overlap portion, and a forming unit forming the overlap portion into a cone shape, in which the top is located. The formed overlap portion is clamped by a set of inner and outer ring brackets.

3 Claims, 11 Drawing Sheets

APPARATUS FOR PROCESSING TERMINAL TREATMENT OF BRAID OF A SHIELD WIRE

CROSS REFERENCE TO RELATED APPLICATIONS

This application is a divisional of U.S. patent application Ser. No. 12/457,021, filed May 29, 2009, now U.S. Pat. No. 8,191,250, issued Jun. 5, 2012. The priority application Number Japan Patent Application 2008-174599 which this patent application is based is hereby incorporated by reference.

FIELD OF THE INVENTION

This invention relates to a shield wire including a braid electrically shielding an electric wire by covering the electric wire, a method for processing terminal treatment of the braid of the shield wire, and an apparatus for processing the terminal treatment of the braid.

BACKGROUND OF THE INVENTION

Description of the Related Art

In general, a shield wire, in which an electric wire is covered with a braid and a ground terminal is attached at an end of the braid, is well-known for shielding the electric wire connecting electronic devices (for example, in Patent Document 1).

FIG. 13 shows a usual shield wire in a cross-sectional view. The shield wire 201 shown in FIG. 13 includes at least one electric wire 202 connecting electronic apparatuses in a car to each other, a braid 205 covering the electric wire 202, an insulation sheath 206 covering the braid 205, and a set of inner/outer metal brackets 208, 211 arranged at an end of the braid 205. At an end 201*a* of the shield wire 201, the braid 205 is exposed by removing the sheath 206.

The braid 205 is formed into a cylindrical shape by braiding electric-conductive thin wires. The set of metal brackets 208, 211 attached at the end of braid 205 is for grounding the braid 205 to a car body of the car or an enclosure of the electronic apparatus.

The inner metal bracket 208 of the set of metal brackets includes a cylinder 209 formed into a ring shape, and a tab bracket 210 to be mounted at the car body or the enclosure. The cylinder 209 has a cylindrical large-diameter portion 291, a cylindrical small-diameter portion 292, which diameter is smaller than the large-diameter portion and a joint portion 293 connecting an end edge of the large-diameter portion 291 and an end edge of the small-diameter portion 292. The outer metal bracket 211 of the set of metal brackets is formed into a ring shape and positioned around the small-diameter portion 292 so as to clamp the braid 205 between the small-diameter portion 292 and it.

The set of metal brackets 208, 211 are attached at the end of the braid 205 as following. First, the small-diameter portion 292 of the inner metal bracket 208 is covered around itself with the end of the braid 205. Since, at the time, a top of the end of the braid 205*b* is easily unbraided or was upbraided, a position offset to a far-side 205*a* from the top 205*b* of the braid 205 is attached on an outer surface around the small-diameter portion 292 and the small-diameter portion 292 is covered with the braid 205. Thereafter, the outer metal bracket 211 is arranged around the small-diameter portion 292 and around the far-side part 205*a* from the top 205*b* and the outer metal bracket 211 is caulked to be decreased about its diameter by a crimping machine. The top 205*b* of the braid 205 coming from between the small-diameter portion 292 and the outer metal bracket 211 is folded to a far-side of the braid 205 by a hand with a tool such as a spatula, and the folded top 205*b* is covered with an adhesive tape 212 by winding the tape 212 around the top 205*b*. Patent document 1, Japan Patent published Application 2003-257264 should be referred.

SUMMARY OF THE INVENTION

Objects to be Solved

In an operation of attaching the set of metal brackets 208, 211 at the end of the braid 205, following problem exits. An amount (length) of the top 205*b* of the braid 205 coming out from between the small-diameter portion 292 and the outer metal bracket 211 is required to be controlled, and the operation is complicated. The operation of folding the top 205*b* cannot be easily automated. And the operation of folding the top is inefficient operation for watching to eliminate unfolded parts of the top 205*b* of the braid 205. Also, it is afraid that the top 205*b* prick the operator's finger, and it is unsafe.

According to the above problems, an object of the present invention is to provide a shield wire, in which can improve efficiency of processing terminal treatment of braid of the shield wire, a method for processing the terminal treatment of braid, and a apparatus for processing the terminal treatment of braid.

How to Attain the Object of the Present Invention

In order to overcome the above problems and attain the object of the present invention, a shield wire includes an electric wire, a cylindrical braid covering the electric wire, an adhesive tape wound around a top of a braid for preventing unbraiding the top of the braid, a set of inner and outer metal ring brackets. The top of the braid wound with the adhesive tape is pushed from the top toward a far-side from the top of the braid to be overlapped, so as to fold a part of the braid from the top into the braid itself to form an overlap portion, and the set of inner and outer metal ring brackets clamps the overlap portion so as to maintain the overlap portion in a cone shape, in which the top is located.

A method for processing terminal treatment of braid of a shield wire according to the present invention includes steps of winding an adhesive tape around a top of a cylindrical braid covering an electric wire, pushing the top from the top toward a far-side from the top of the braid to be overlapped, so as to fold a part of the braid from the top into the braid itself to form an overlap portion, forming the overlap portion approximately into a cone shape, in which the top is located, and attaching a set of inner and outer metal ring brackets to the overlap portion by clamping the formed overlap portion between the set of ring brackets.

An apparatus for processing terminal treatment of braid of a shield wire according to the present invention includes a first hold unit holding a top of the braid covering an electric wire, a second hold unit holding a far-side from the top of the braid to be overlapped, a push unit pushing the top toward the far-side of the braid so as to fold a part of the braid from the top into the braid itself to form an overlap portion, and a forming unit forming the overlap portion approximately into a cone shape, in which the top is located.

In the apparatus for processing terminal treatment of braid of a shield wire mentioned above, the forming unit includes a plurality of outer forming pieces structuring an outer forming die having a truncated cone shape of a decreasing inner diameter along a direction from the top toward the far-side of the braid for positioning the overlap portion in the outer forming die, a drive unit moving the plurality of outer forming pieces close to and apart from each other in a radial direction perpendicular to the direction from the top toward the far-side of the braid, a plurality of inner forming pieces structuring an inner forming die pressing the overlap portion against an inner surface of the outer forming die, and a support unit supporting the plurality of inner forming pieces movably in the radial direction and the direction from the top toward the far-side of the braid.

The apparatus for processing terminal treatment of braid of a shield wire mentioned above further includes a bracket hold unit supporting movably an outer metal ring bracket of a set of inner and outer metal ring brackets between a position, in which the far-side of the braid held by the first hold unit and the second hold unit is located in the outer metal ring bracket, and another position, in which the overlap portion held by the second hold unit is located in the outer metal ring, bracket, and a transfer unit positioning the bracket hold unit at the position until the overlap portion is formed securely, and after the overlap portion is formed, transferring the bracket hold unit at the another position.

Effects of the Invention

The shield wire according to the present invention includes the electric wire, the cylindrical braid covering the electric wire, the adhesive tape wound around the top of the braid for preventing unbraiding the top of the braid, the set of inner and outer metal ring brackets. The top of the braid is pushed from the top toward the far-side to be overlapped of the braid so as to fold the part from the top into the braid itself to form the overlap portion, and the set of inner and outer metal ring brackets clamps the overlap portion so as to maintain the overlap portion in the cone shape, in which the top is located. Thereby, terminal treatment of the braid for attaching the set of inner and outer metal ring brackets at the overlap portion can be processed easily and safely, and efficiency of processing the terminal treatment can be improved. In addition, the processing can be automated by an apparatus, so that efficiency of the processing can be more improved. The shield wire has triply overlapped braid at the end of the braid by the top and folded portion, so that density of braid is increased and shield performance will be improved. According to the shield wire, the overlap portion is clamped between the set of inner and outer metal ring brackets, so that without unbraiding the overlap portion, the overlap portion can be arranged uniformly about density of the braid around the overlap portion between the set of inner and outer metal ring brackets. Thus, shield performance decreased by decreasing braid density by the cone shape can be prevented by the overlap portion. Unbraiding at the top and the top coming out of the overlap portion can be prevented in a long period by winding the adhesive tape around the top of the braid.

The method for processing terminal treatment of braid of the shield wire according to the present invention includes steps of winding the adhesive tape around the top of the cylindrical braid covering the electric wire, pushing the top from the top toward the far-side to be overlapped of the braid so as to fold the part of the braid from the top into the braid itself to form the overlap portion, forming approximately into the cone shape, in which the top is located, and attaching the set of metal ring brackets by clamping the formed overlap portion. Thereby, unbraiding the top of the braid in a process of pushing the top is prevented by winding the tape. Thus, the top can be pushed easily from the top toward the far-side of the braid. A folding line at an end of the overlap portion is positioned in the same plane, so that the overlap portion and the set of metal ring brackets can be positioned securely in a process of attaching the set of metal ring brackets. Thus, the overlap portion can be clamped between the set of metal ring brackets, and a yield of products can be improved. Thereby, terminal treatment of the braid for attaching the set of metal ring brackets at the overlap portion can be processed easily and safely, and efficiency of processing the terminal treatment can be improved. In addition, the processing can be automated by an apparatus, so that efficiency of the processing can be more improved.

The apparatus for processing terminal treatment of braid of the shield wire according to the present invention includes the first hold unit holding the top of the braid covering the electric wire, the second hold unit holding the far-side of the braid from the top, the push unit pushing the top from the top toward the far-side of the braid so as to fold the part of the braid from the top into the braid itself to form the overlap portion, and the forming unit forming the overlap portion approximately into the cone shape, in which the top is located. The apparatus for processing terminal treatment having the simple structure can automate the terminal treatment of the braid. A folding line at an end of the overlap portion is positioned in the same plane, so that the overlap portion and the set of inner and outer metal ring brackets can be positioned securely in a process of attaching the set of inner and outer metal ring brackets. Thus, the overlap portion can be clamped between the set of inner and outer metal ring brackets, and a yield of products can be improved. Thereby, terminal treatment of the braid for attaching the set of inner and outer metal ring brackets at the overlap portion can be processed easily and safely, and efficiency of processing the terminal treatment can be improved.

In the apparatus for processing terminal treatment of braid of the shield wire mentioned above, the forming unit includes the plurality of outer forming pieces structuring the outer forming die having the truncated cone shape of the decreasing inner diameter along the direction from the top toward the far-side of the braid for positioning the overlap portion in the outer forming die, the drive unit moving the plurality of outer forming pieces close to and apart from each other in the radial direction perpendicular to the direction from the top toward the far-side of the braid, the plurality of inner forming pieces structuring the inner forming die pressing the overlap portion against an inner surface of the outer forming die, and a support unit supporting the plurality of inner forming pieces freely in the radial direction and the direction from the top toward the far-side of the braid. Thereby, a series of processing the terminal treatment of the braid can be processed continuously so that process tact time is short and an apparatus for processing terminal treatment of the braid with a small foot print can be provided. Then, the process terminal treatment can be more improved about its efficiency.

The apparatus for processing terminal treatment of braid of the shield wire mentioned above further includes the bracket hold unit supporting movably the set of inner and outer metal ring brackets between the position, in which the far-side to be overlapped of the braid held by the first hold unit and the second hold unit is located in the set of inner and outer metal ring brackets, and another position, in which the overlap portion held by the second hold unit is located in the set of inner and outer metal ring brackets, and the transfer unit positioning the bracket hold unit at the position until the overlap portion is formed securely, and after the overlap portion is formed, transferring the bracket hold unit at the another position. Thereby, a series of processing the terminal treatment of the braid can be processed continuously so that process tact time is short and an apparatus for processing terminal treatment of the braid with a small foot print can be provided. Then, the process terminal treatment can be more improved about its efficiency. Furthermore, the set of inner and outer metal can be positioned around the overlap portion so as to prevent from deforming the overlap portion.

The above and other objects and features of this invention will become more apparent from the following description taken in conjunction with the accompanying drawings.

DESCRIPTION OF THE PREFERRED EMBODIMENT

A shield wire, a method for processing terminal treatment of the shield wire, and an apparatus for processing terminal treatment of the shield wire of a first embodiment according to the present invention will be described as followings with reference to FIGS. 1-12.

Figure 1:
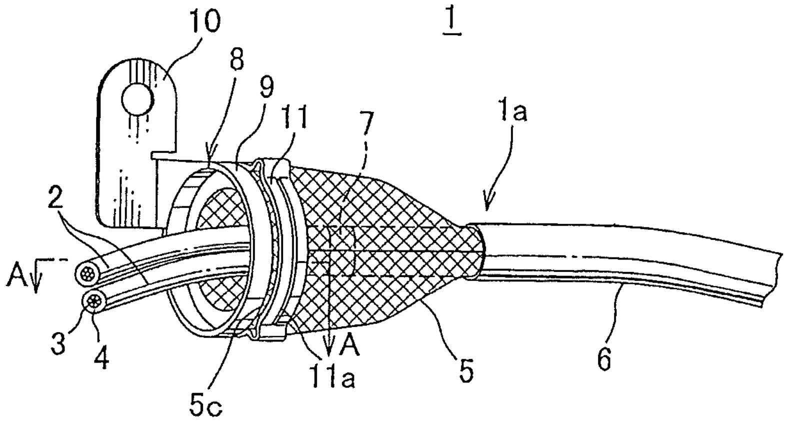
FIG. 1 is a perspective view of a shield wire of an embodiment according to the present invention.
Figure 2:
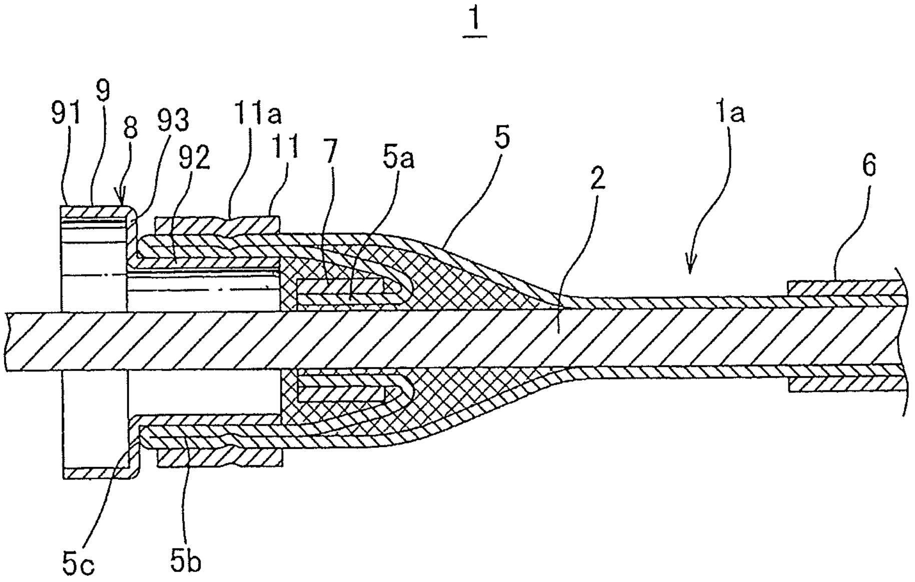
FIG. 2 is a cross-sectional view taken along a line II-II in FIG. 1.
Figure 3:
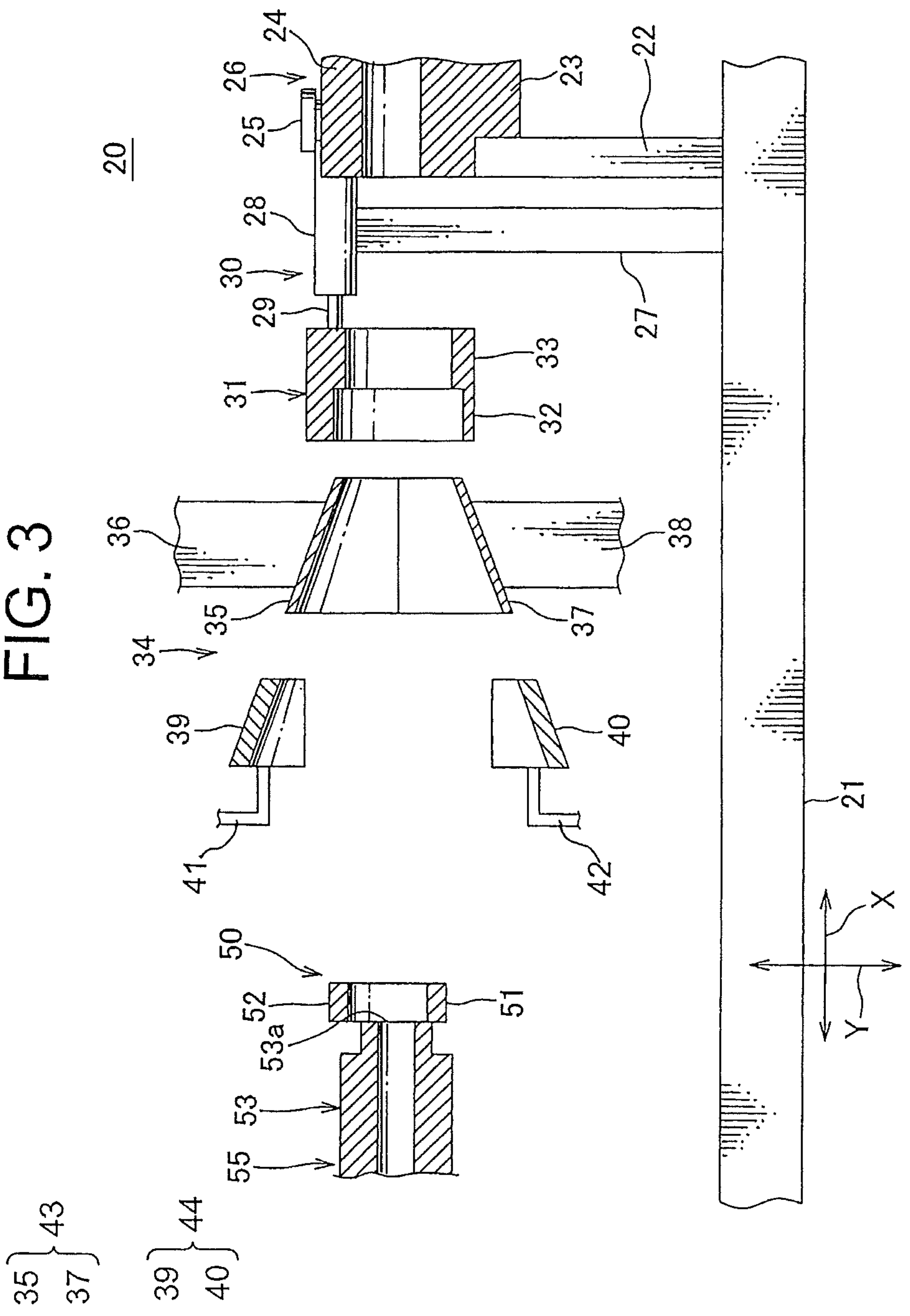
FIG. 3 is an illustration showing an outline structure of an apparatus for processing terminal treatment of a braid of the shield wire shown in FIG. 1.
Figure 4:
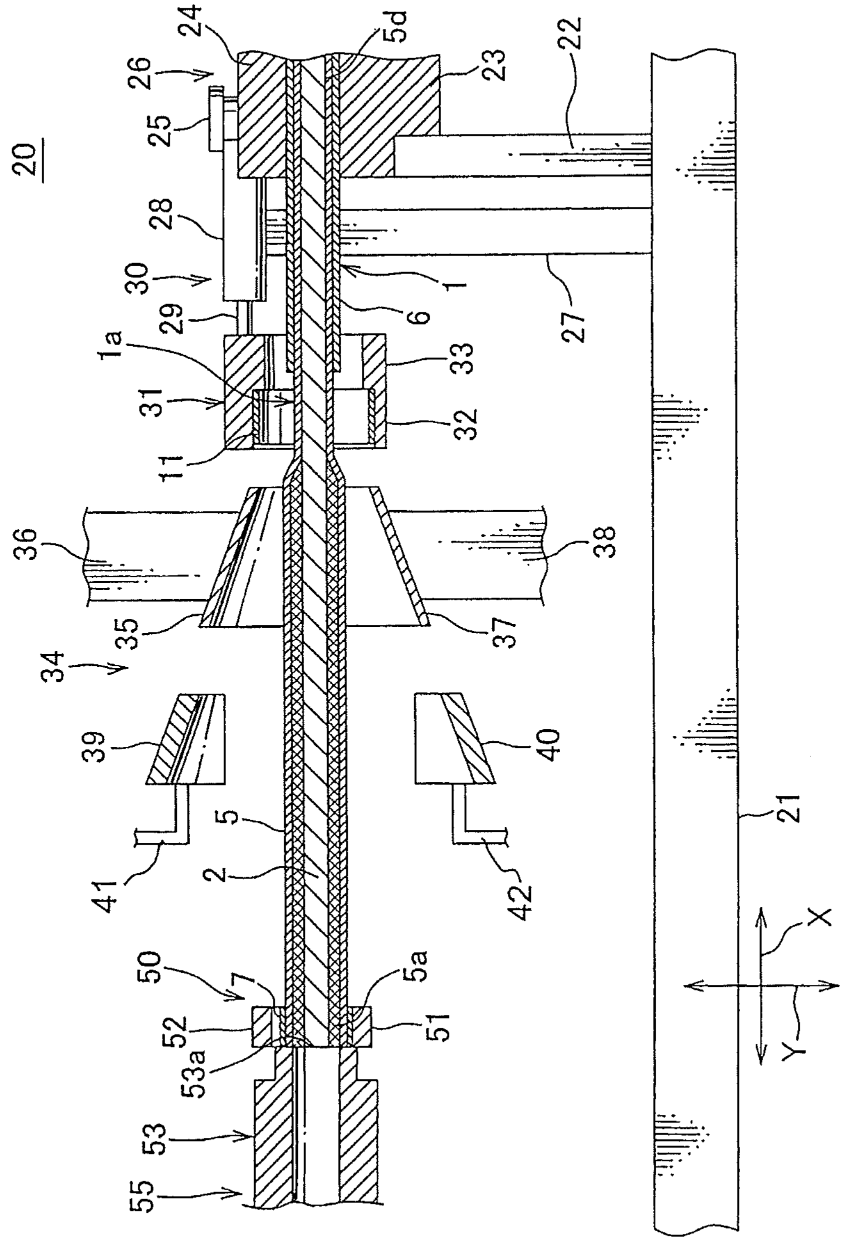
FIG. 4 is an illustration showing a condition that the shield wire is set at the apparatus shown in FIG. 3.
Figure 5:
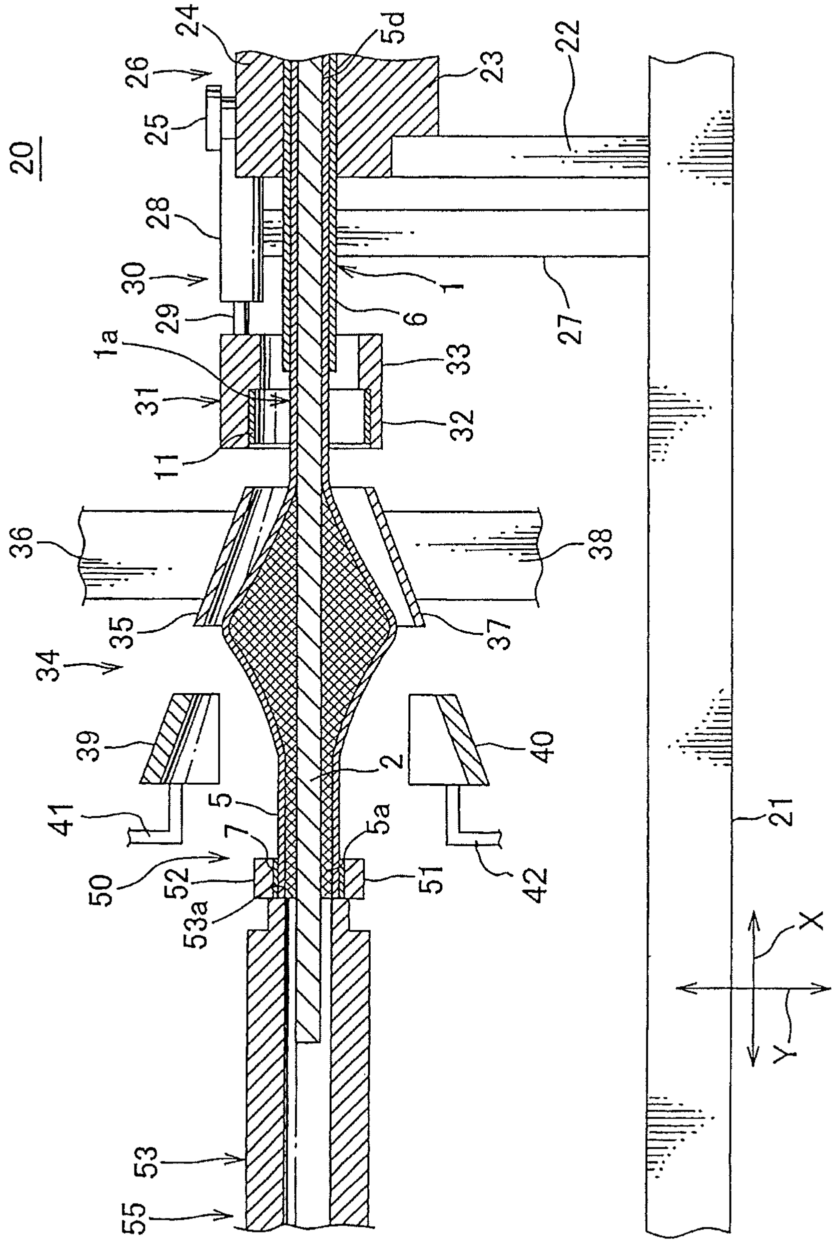
FIG. 5 is an illustration showing a condition that a top of the braid is being pushed from the top toward a far-side of the braid by a push unit of the apparatus shown in FIG. 4.
Figure 6:
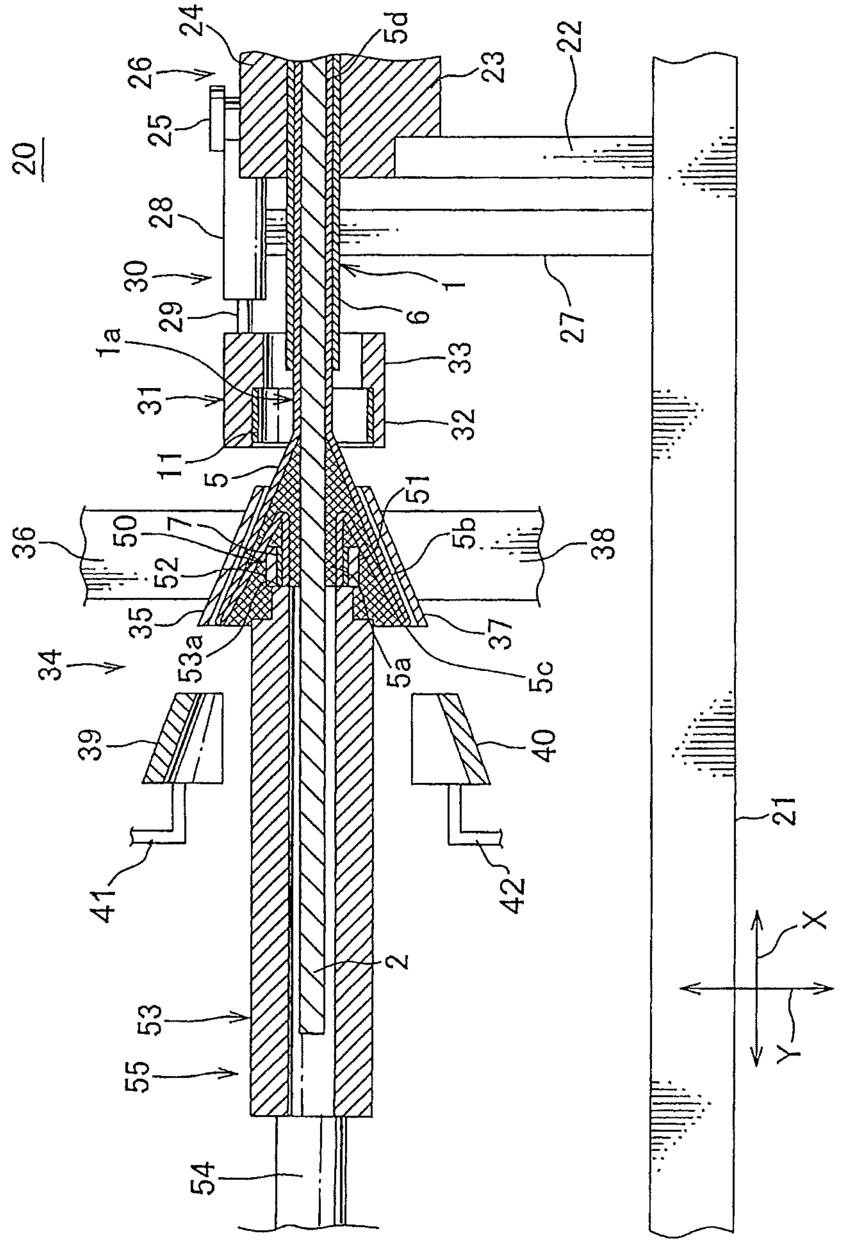
FIG. 6 is an illustration showing a condition that the push unit shown in FIG. 5 forms an overlap portion overlapping the braid.
Figure 7:
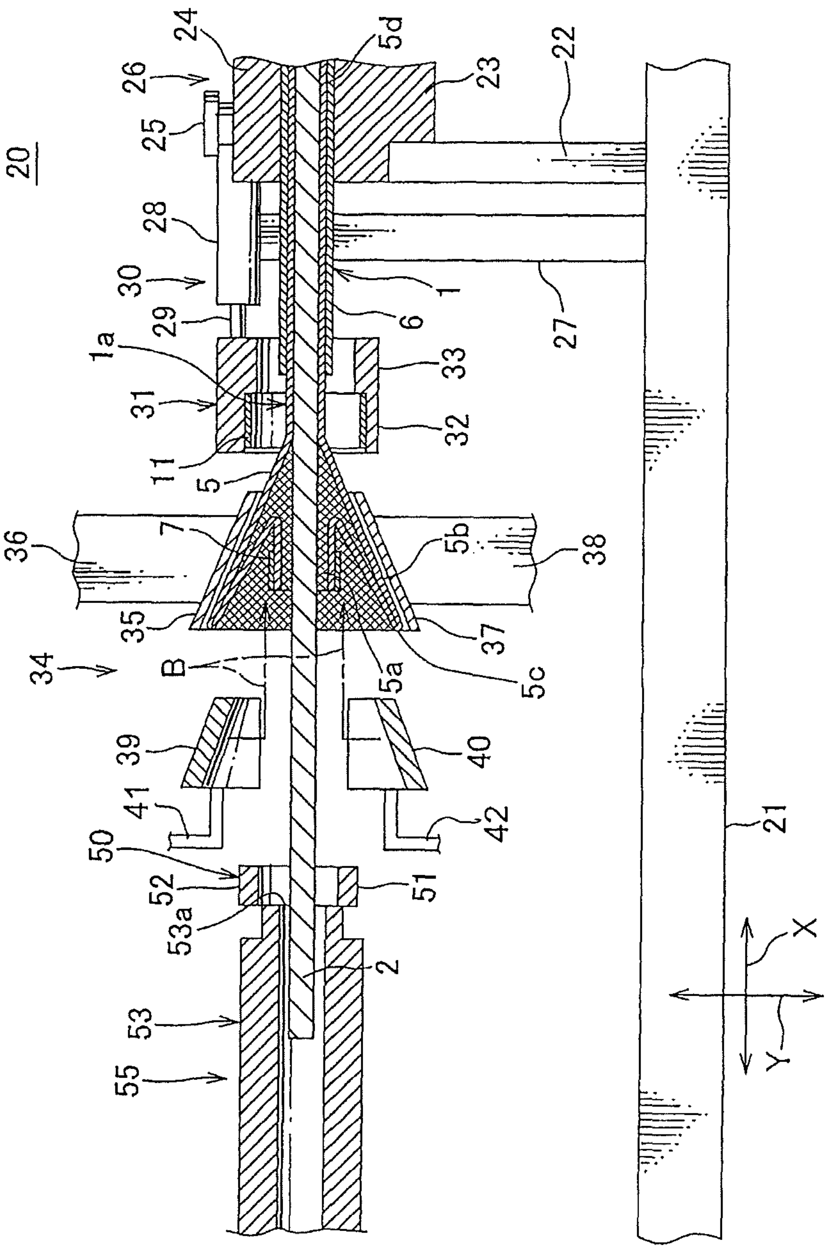
FIG. 7 is an illustration showing a condition that a first hold unit and the push unit shown in FIG. 6 are moved apart from the overlap portion.
Figure 8:
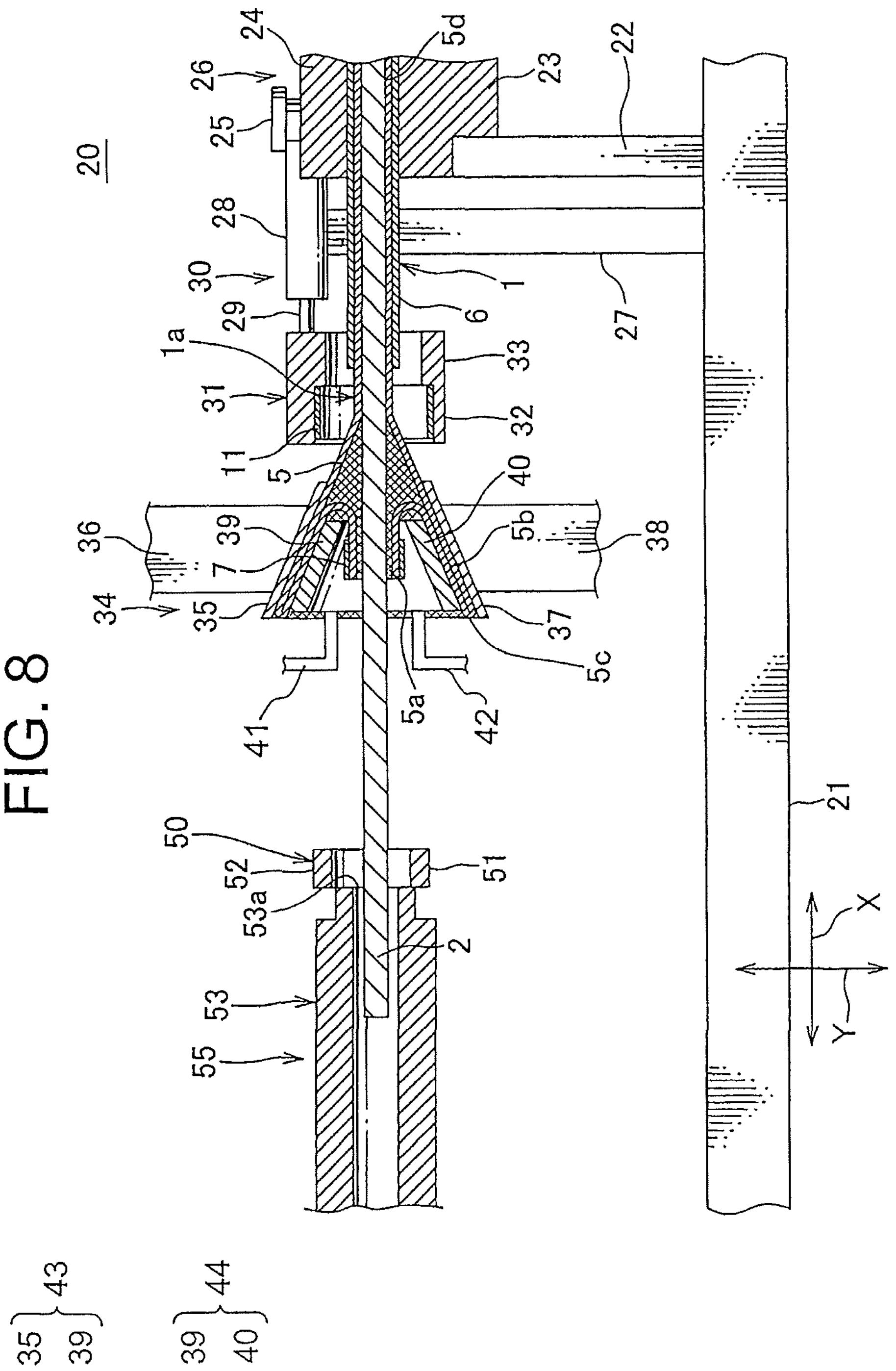
FIG. 8 is an illustration showing a condition that a forming unit shown in FIG. 7 is forming the overlap portion into a cone shape.
Figure 9:
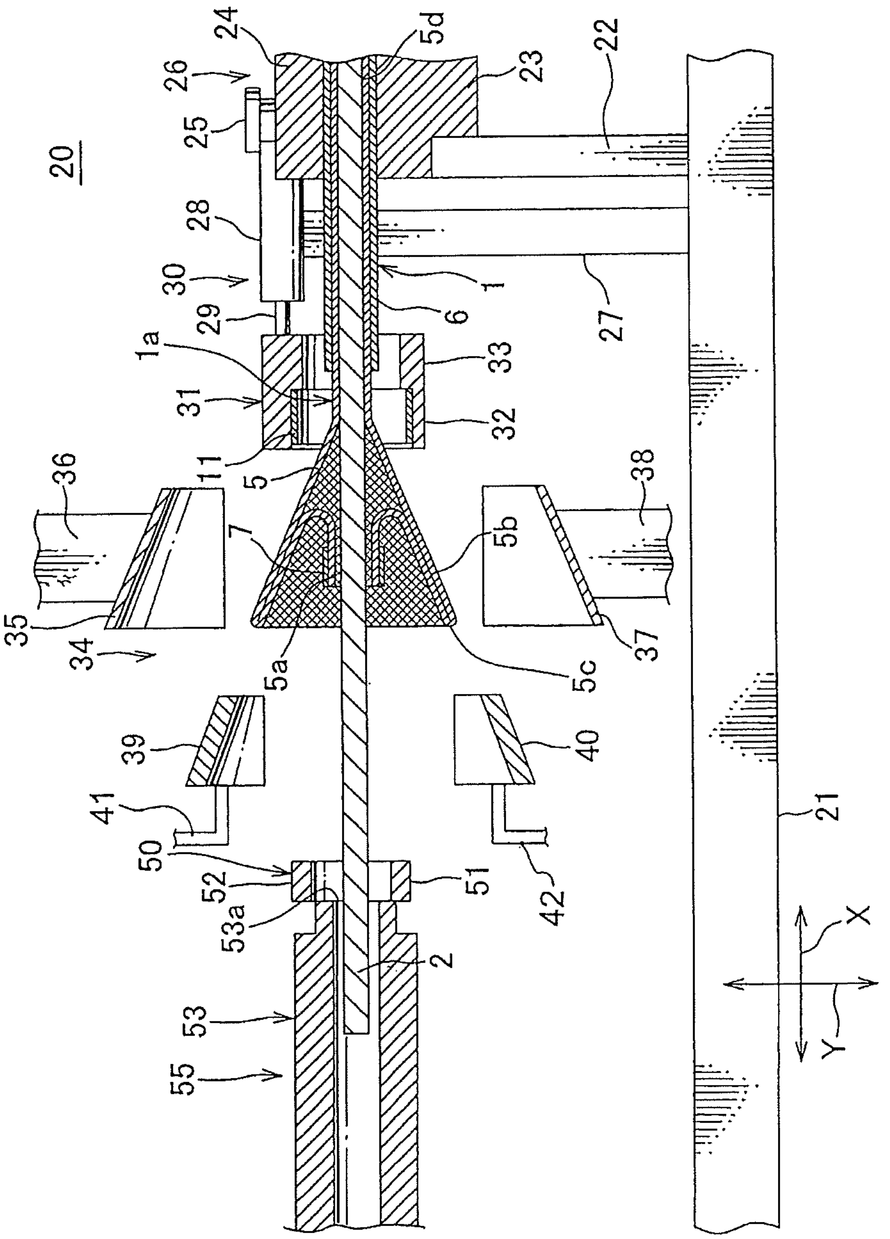
FIG. 9 is an illustration showing a condition that the forming unit is moved apart from the overlap portion.
Figure 10:
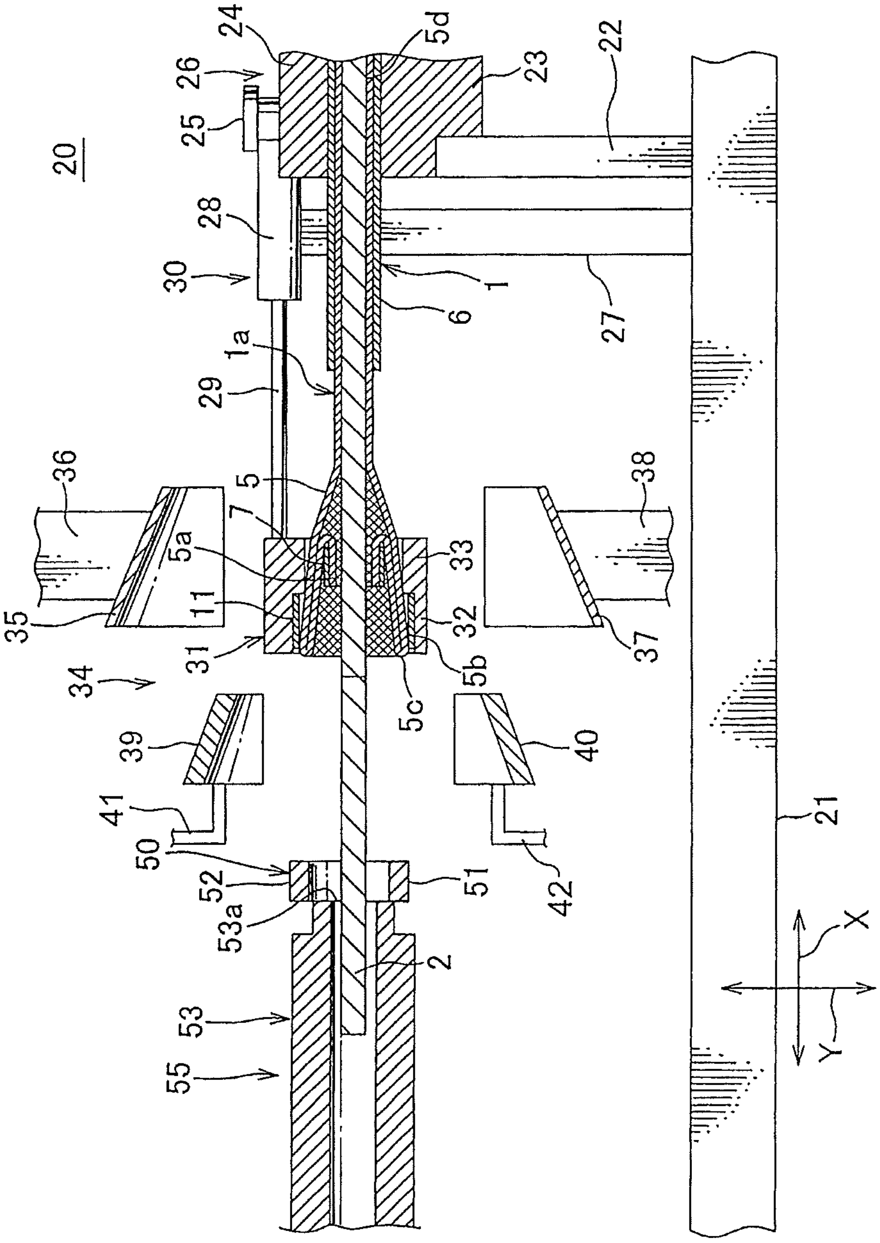
FIG. 10 is an illustration showing a condition that a transfer unit shown in FIG. 9 moves a bracket hold unit to a position of the overlap portion.
Figure 11:
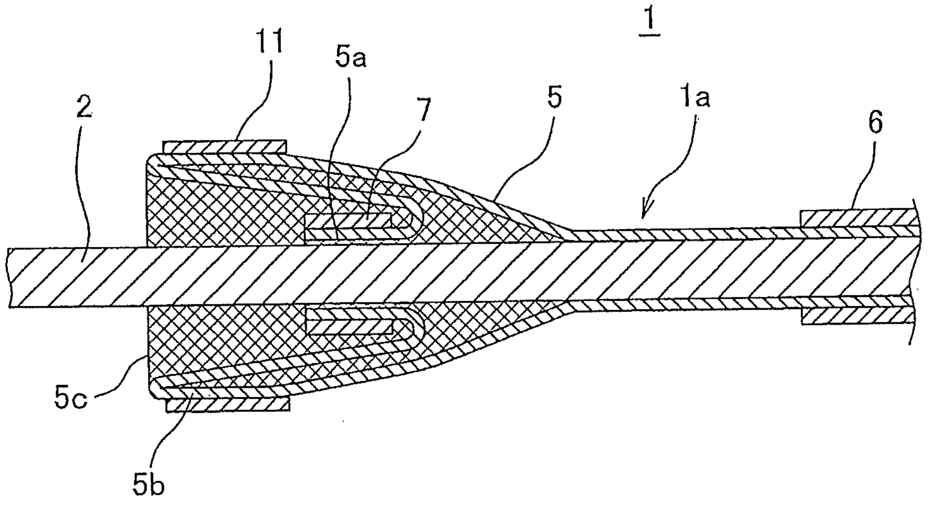
FIG. 11 is a cross-sectional view of the shield wire removed from the apparatus for processing terminal treatment of the braid of the shield wire shown in FIG. 10.
Figure 12:
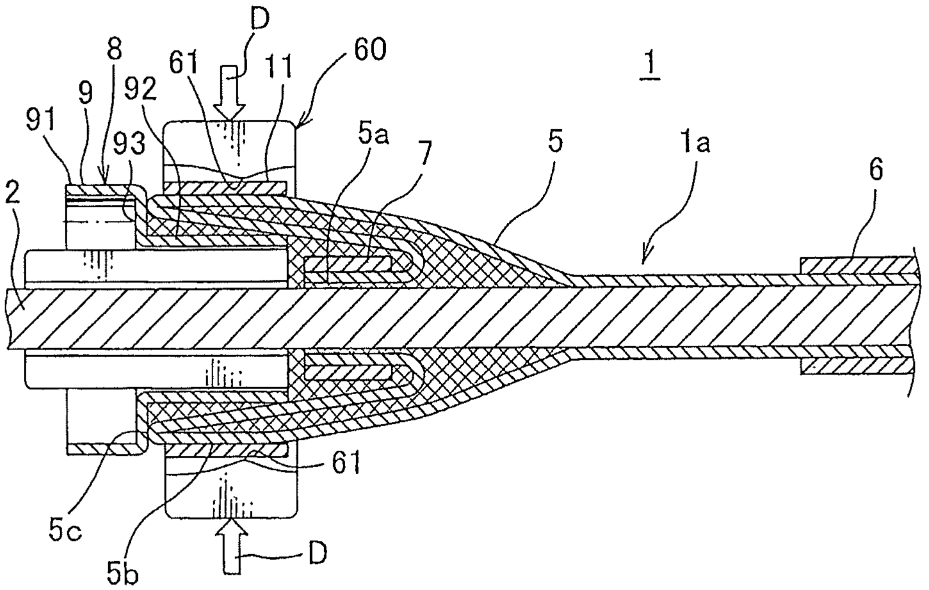
FIG. 12 is a cross-sectional view of the overlap portion shown in FIG. 11 clamped between a set of inner and outer metal ring brackets.
Figure 13:
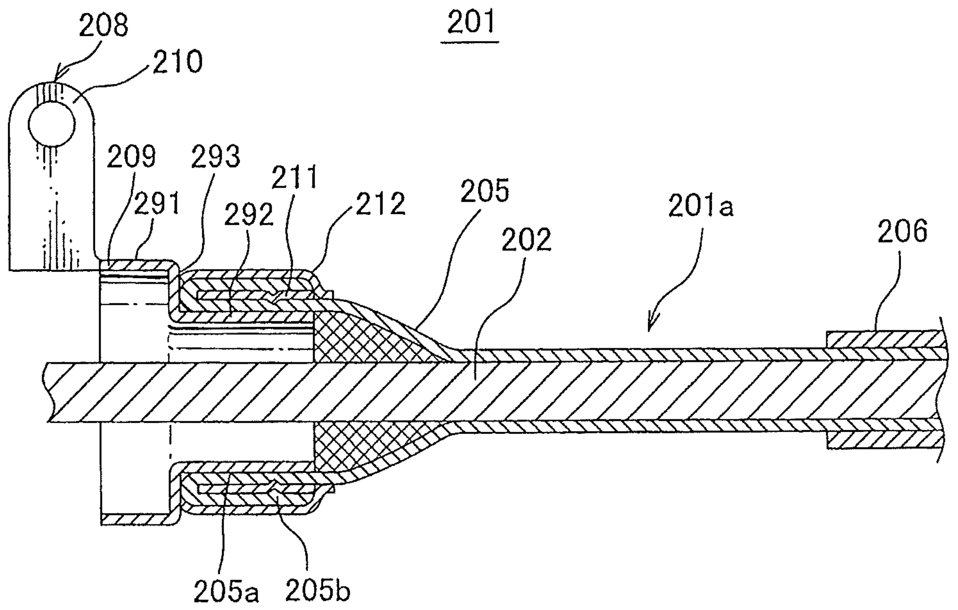
FIG. 13 PRIOR ART
FIG. 13 is a cross-sectional view of a usual shield wire by prior art.

FIG. 1 is a perspective view of a shield wire of an embodiment according to the present invention. FIG. 2 is a cross-sectional view taken along a line II-II in FIG. 1. FIG. 3 is an illustration showing an outline structure of an apparatus for processing terminal treatment of a braid of the shield wire shown in FIG. 1. FIG. 4 is an illustration showing a condition that the shield wire is set at the apparatus shown in FIG. 3. FIG. 5 is an illustration showing a condition that a top of the braid is being pushed from the top toward a far-side of the braid by a push unit of the apparatus shown in FIG. 4. FIG. 6 is an illustration showing a condition that the push unit shown in FIG. 5 forms an overlap portion overlapping the braid. FIG. 7 is an illustration showing a condition that a first hold unit and the push unit shown in FIG. 6 are moved apart from the overlap portion. FIG. 8 is an illustration showing a condition that a forming unit shown in FIG. 7 is forming the overlap portion into a cone shape. FIG. 9 is an illustration showing a condition that the forming unit is moved apart from the overlap portion. FIG. 10 is an illustration showing a condition that a transfer unit shown in FIG. 9 moves a bracket hold unit to a position of the overlap portion. FIG. 11 is a cross-sectional view of the shield wire removed from the apparatus for processing terminal treatment of the braid of the shield wire shown in FIG. 10. FIG. 12 is a cross-sectional view of the overlap portion shown in FIG. 11 clamped between a set of inner and outer metal ring brackets.

As shown in FIGS. 1, 2, the shield wire according to the present invention includes one or more electric wires 2 connecting electronic devices in a car to each other, a braid 5 covering the electric wires 2, a sheath 6 covering the braid 5, a heat-resistant adhesive tape 7 wounded around a top 5*a* of the braid 5 for preventing unbraiding the top 5*a* of the braid 5, and a set of inner and outer metal ring brackets 8, 11. The top 5*a* of the braid 5 is pushed from the top 5*a* toward a far-side 5*d* of the braid 5 (shown in FIG. 4) so as to fold a part of the braid 5 from the top 5*a* into the braid 5 itself to form an overlap portion 5*b*, forming approximately into a cone shape. The set of inner and outer metal ring brackets 8, 11 clamps the overlap portion 5*b* therebetween so as to maintain the cone shape of the overlap portion, in which the top 5*a* is located. In the shield wire 1, the top 5*a* and the overlap portion 5*b*, that is an end of the braid 5, is exposed at an end 1*a* of the shield wire 1 by removing the sheath 6 from the shield wire 1.

In the description, the top 5*a* of the braid 5 means an end edge of the braid 5 in a lengthwise direction of the braid 5 in a condition before the overlap portion 5*b* is formed. The far-side 5*d* of the braid 5 means an opposite side of the braid 5 from the top 5*a* in the lengthwise direction. A part marked with 5*c* in FIGS. 1, 2 shows a folding line at an end of the overlap portion 5*b* in the lengthwise direction of the braid 5.

The shield wire 1 in the embodiment has two wires 2 connecting an inverter and a motor as electronic devices in a hybrid car. Each of the wires 2 is a round wire including core wires 3 made of a metal such as aluminum and an insulation cover 4 covering the core wires 3.

The braid 5 is formed into a cylindrical shape by braiding conductive thin wires. The braid 5 is for shielding wires from effects by electric noises caused by electro-magnetic waves or static electricity. In short, the braid 5 is for electro-magnetic shielding the electric wires 2. The braid 5 in the embodiment is formed with thin aluminum wires.

The set of inner and outer metal ring brackets 8, 11 is for grounding the braid 5 to a car body or a frame of the electronic device of the car. The inner ring bracket 8 includes a ring-shaped ring portion 9 and a bracket 10 to be attached on the car body or the frame. The ring portion 9 includes a cylindrical large diameter portion 91, a cylindrical small diameter portion 92 having a smaller diameter than the large diameter portion 91, and a joint portion 93 joining an end edge of the large diameter portion 91 and an end edge of the small diameter portion 92. The outer ring bracket 11 is formed into a cylindrical shape to be arranged around the small diameter portion 92 for clamping the overlap portion 5*b* between the small diameter portion 92 and itself to be electrically connected with the braid 5. The set of inner and outer ring brackets 8, 11 is made of aluminum. The large diameter portion 91, the small diameter portion 92 and the outer ring bracket 11 are formed into an oval cross-sectional cylindrical shape.

The outer ring bracket 11 is formed into the oval cross-sectional shape before attached with the overlap portion 5*b*. The outer ring bracket 11 is crimped by a later-described crimping device to have smaller diameter than that before crimped, as shown in FIG. 1. The outer ring bracket 11 crimped for joining the overlap portion 5*b* has projections 11*a* projecting inwardly toward the overlap portion 5*b* over a round. The projections 11*a* are for improving reliability of connection between the overlap portion 5*b* and the outer ring bracket 11.

In the shield wire 1, as shown in FIGS. 1, 2, the folding line 5*c* of the overlap portion 5*b* abuts on the joint portion 93 of the inner ring bracket 8, over the all surface so as to be positioned closer to the joint portion 93 than the end edge of the outer ring bracket 11. Thus, the end of the overlap portion 5*b* is exposed from between the small diameter portion 92 and the outer ring bracket 11 toward the joint portion 93. Exposed length of the end of the overlap portion 5*b* is substantially same over a round of the overlap portion 5*b*. The top 5*a* of the braid 5, on which the adhesive tape 7 is wound, is positioned closer to the far-side of the braid 5 than the folding line 5*c*.

Thus, in the shield wire 1 according to the present invention, the overlap portion 5*b*, the top 5*a* and the braid itself are triply overlapped at the end of the braid 5. Density of the braid 5 at the end thereof can be increased, so that performance of electro-magnetic shielding can be improved.

In the shield wire 1 according to the present invention, the overlap portion 5*b* is clamped between the set of inner and outer ring brackets 8, 11, so that the overlap portion 5*b* is prevented from unbraiding, and maintained uniformly over a round of the overlap portion 5*b* about the density of the braid between the set of inner and outer ring brackets 8, 11. Decreasing of shield effect at the overlap portion 5*b* caused by decreased density of the braid by the cone shape can be prevented.

In the shield wire 1 according to the present invention, the adhesive tape 7 is wound around an outer surface of the top 5*a* of the braid 5. Thereby, it can be prevented that the braid 5 is unbraided from the top 5*a*, and that the top 5*a* comes out of the overlap portion 5*b* in a long period. Thus, it is prevented that the top 5*a* pricks the operator's finger when the top 5*a* comes out of the overlap portion 5*b*, so that safety and stable shield performance can be maintained in a long period.

In the shield wire 1 according to the present invention, the inner ring bracket 8 includes the joint portion 93, so that, when the overlap portion 5*b* is clamped between the set of inner and outer ring brackets 8, 11, the folding line 5*c* can be abutted on the joint portion 93. Thereby, the overlap portion 5*b* can be positioned easily and securely at the inner ring bracket 8. Thus, the overlap portion 5*b* can be clamped securely between the set of inner and outer brackets 8, 11.

Since the shield wire 1 is structured as mentioned above, terminal treatment of the braid, that is attaching the set of inner and outer ring brackets 8, 11 to the overlap portion 5*b*, can be acted by easy and safe operation, and efficiency of processing the terminal treatment can be improved. In addition, the processing of terminal treatment can be automated by an apparatus for terminal treatment, so that the efficiency of the processing and a yield of products can be more improved.

When the set of inner and outer ring brackets 8, 11 is attached at the overlap portion 5*b*, an apparatus 20 for processing terminal treatment of braid, shown in FIGS. 3-10, and a crimping apparatus shown in FIG. 12 are used. The apparatus 20 for processing terminal treatment pushes the top 5*a* of the braid toward the far-side 5*d* so as to form the overlap portion 5*b*, forms the overlap portion 5*b* into a cone shape, in which the top 5*a* is positioned, and positions the outer ring bracket 11 around the formed overlap portion 5*b*. The crimping apparatus crimps the outer ring bracket 11 arranging the overlap portion 5*b* between the small diameter portion 92 and itself so as to be decreased about its diameter.

The apparatus 20 for processing terminal treatment of a braid, as shown in FIG. 3, includes a base frame 21, a first hold unit 50 holding the top 5*a* of the braid 5 wound with the adhesive tape 7, a second hold unit 26 holding a far-side 5*d* of the braid 5, a push unit 55 pushing the top 5*a* toward the far-side 5*d* so as to form the overlap portion 5*b*, a forming unit 34 forming the overlap portion 5*b* into a cone shape, in which the top 5*a* is located, a bracket hold unit 31 holding the outer ring bracket 11, a transfer unit 30 moving the bracket hold unit 31 in a lengthwise direction of the base frame 21, and a control unit.

The base frame 21 is formed into a plate shape and arranged on a floor of a facility. In the embodiment, the base frame 21 is formed into a rectangular shape. An arrow X in FIGS. 3-10 shows a direction parallel to a lengthwise direction of the base frame 21. An arrow Y shows a direction parallel to a vertical direction perpendicular to the lengthwise direction X of the base frame.

The first hold unit 50 is arranged above one end in a lengthwise direction of the base frame 21 so as to be attached at a later-described wire receiving pipe 53 of a push unit 55. The first hold unit 50 includes a fixed member 51 fixed at the wire receiving pipe 53, a moving member 52 freely moving against the fixed member 51 so as to clamp the top 5*a* of the braid 5 between the fixed member 51 and the moving member 52, and a clamp member moving the moving member 52 against the fixed member 51. The first hold unit 50 positions the top 5*a* of the braid 5 between the fixed member 51 and the moving member 52 and moves the moving member 52 toward the fixed member 51 by the clamp member and clamps the top 5*a* between the fixed member 51 and the moving member 52 so as to hold the top 5*a*. The first hold unit 50 holds the top 5*a* so as to align the lengthwise direction of the braid 5 in parallel to the lengthwise direction of the base frame 21.

The second hold unit 26 is arranged above the other end in the lengthwise direction of the base frame 21, and fixed through a column 22 extending vertically from the base frame 21. The second hold unit 26 includes a fixed member 23 fixed at the column 22, a moving member 24 freely moving against the fixed member 23 so as to clamp the far-side 5*d* of the braid 5 between the fixed member 23 and the moving member 24, and a clamp member 25 moving the moving member 24 against the fixed member 23. The second hold unit 26 positions the far-side 5*d* between the fixed member 23 and the moving member 24 and moves the moving member 24 toward the fixed member 23 by the clamp member 25 and clamps the far-side 5*d* between the fixed member 23 and the moving member 24 so as to hold the far-side 5*d*. The second hold unit 26 holds the far-side 5*d* so as to align the lengthwise direction of the braid 5 in parallel to the lengthwise direction of the base frame 21.

The push unit 55 is arranged above the one end in the lengthwise direction of the base frame 21, and includes the wire receiving pipe 53 provided at a far side from the second hold unit 26 of the first hold unit 50, and a cylinder moving the wire receiving pipe 53 in the lengthwise direction of the base frame 21.

An axis of the wire receiving pipe 53 is in parallel to a lengthwise direction of the braid 5 held by the first hold unit 50 and the second hold unit 26. An inner space of the wire receiving pipe 53 communicates with spaces between the fixed member 51 and the moving member 52 so as to receive the electric wire 2 extending from the top 5*a* freely in the spaces (shown in FIGS. 5-10). An inner diameter of the wire receiving pipe 53 is smaller than an outer diameter of the top 5*a* so that an end surface of the top 5*a* held at the first hold unit 50 abuts on an end surface 53*a* close to the first hold unit 50 of the wire receiving pipe 53.

The cylinder includes a cylinder main body fixed at the base frame 21 through a column extending vertically from the base frame 21, and a rod 54 moving back and forth from the cylinder main body (shown in FIG. 6). The rod 54 is joined to the wire receiving pipe 53. A direction of the rod 54 moving from the cylinder main body is in parallel to the lengthwise direction of the braid 5 held by the first hold unit 50 and the second hold unit 26. Thereby, the rod 54 can move the wire receiving pipe 53 in the lengthwise direction of the braid 5.

The end surface 53*a* of the wire receiving pipe 53 abuts on the top 5*a* of the braid 5 held by the first hold unit 50 and the second hold unit 26 (shown in FIG. 4). The wire receiving pipe 53 moves toward the second hold unit 26, and pushes the top 5*a* of the braid 5 to move toward the second hold unit 26, that is to move toward the far-side 5*d* of the braid 5. Thereby, the overlap portion 5*b* is formed, and the electric wire 2 is partially projected from the top 5*a* so as to be received in the inner space of the wire receiving pipe 53 (shown in FIGS. 5, 6). The first hold unit 50 moves interlockingly with the wire receiving pipe 53.

According to the present invention, the adhesive tape 7 is wound around the top 5*a* of the braid 5, so that, when the push unit 55 pushes the top 5*a*, it is prevented that the top 5*a* is unbraided. Thereby, the top 5*a* can be easily moved toward the far-side 5*d* of the braid 5.

The forming unit 34 is arranged between the first hold unit 50 and the second hold unit 26 above a central portion in the lengthwise direction of the base frame 21. The forming unit 34 includes a pair of outer forming pieces 35, 37 structuring an outer forming die 43, a drive unit moving the pair of outer forming pieces 35, 37 close to and apart from each other in a radial direction perpendicular to the lengthwise direction of the shield wire 2 held by the first hold unit 50 and the second hold unit 26, a pair of inner forming pieces 39, 40 structuring an inner forming die 44, and a support unit 41, 42 supporting the pair of inner forming pieces 39, 40 movably in the radial direction and the lengthwise direction of the electric wire 2 held by the first hold unit 50 and the second hold unit 26.

The pair of outer forming pieces 35, 37 is moved closer to each other in the radial direction of the electric wire 2 held by the first hold unit 50 and the second hold unit 26, i.e. in the vertical direction about the base frame 21, so as to be abutted on each other, so that the overlap portion 5*b* is positioned between the pair of outer forming pieces 35, 37. The pair of outer forming pieces 35, 37, which is abutted on each other, structures the outer forming die 43 having a truncated cone shape of a decreasing inner diameter along a direction from the first hold unit 50 to the second hold unit 26, i.e. the direction from the top 5*a* toward the far-side 5*d* of the braid 5. A center axis of the outer forming die corresponds to, i.e. is coaxial with a center axis of the electric wire 2 held by the first hold unit 50 and the Second hold unit 26.

The drive unit includes a cylinder main body fixed above the base frame 21 through a column, and rods 36, 38 extendable from the cylinder main body. Each of the rods 36, 38 is joined to each of the pair of outer forming pieces 35, 37.

The inner die 44 structured by the pair of inner forming pieces 39, 40 has an outer surface corresponding to an inner surface of the outer forming die 43 structured by the pair to outer forming pieces 35, 37 abutting on each other. The pair of inner forming pieces 39, 40 is moved in the radial direction and the lengthwise direction of the electric wire 2, as shown with an allow B in FIG. 7. Thereby, the pair of inner forming pieces 39, 40 (the inner forming die 44) is positioned in the pair of outer forming pieces 35, 37 (the outer forming die 43) so as to arrange the overlap portion 5*b* between the outer forming pieces 35, 37 and themselves, and then, presses the overlap portion 5*b* to the inner surface of the pair of outer forming pieces 35, 37 (the outer forming die 43).

The support unit 41, 42 includes a cylinder having a rod extendable along the radial direction of the electric wire 2 held by the first hold unit 50 and the second hold unit 26, and a cylinder having a rod extendable along the lengthwise direction of the electric wire 2.

In the forming unit 34, as shown in FIGS. 5, 6, the pair of outer forming pieces 35, 37 is moved so as to abut on each other for structuring the outer forming die 43 and forming the overlap portion 5*b* by pushing the top 5*a* toward the far-side 5*d*. The pair of inner forming pieces 39, 40 (the inner forming die 44) is pushed an inner area from the folding line 5*c* of the overlap portion 5*b* so as to fold the top 5*a* of the braid 5 toward the far-side 5*d*. As shown in FIGS. 7, 8, the pair of inner forming pieces 39, 40 (the inner forming die 44) presses the folded overlap portion 5*b* to the outer forming pieces 35, 37 (the outer forming die 43) so as to form the overlap portion 5*b* into the cone shape in which the top 5*a* is located (shown in FIG. 9). As shown in FIG. 9, the folding line 5*c* of the overlap portion 5*b* formed by the forming unit 34 is formed in a plane.

According to the present invention, the top 5*a* of the braid 5 is supported by the first hold unit 50, and the far-side 5*d* is supported by the second hold unit 26, and the pair of outer forming pieces 35, 37 is positioned so as to abut on each other for structuring the outer forming die 43, and the top 5*a* is pushed toward the far-side 5*d* by the push unit 55. By such simple and safe operation, the overlap portion 5*b* can be formed. Thus, it is prevented that the top 5*a* pricks the operator's finger, so that safety of operation can be maintained.

According to the present invention, the folding line 5*c* of the overlap portion 5*b* formed into the cone shape can be arranged in the one plane. When the overlap portion 5*b* is clamped between the set of inner and outer ring brackets 8, 11, the folding line 5*c* can be abutted on the joint portion 93 so as to position securely the overlap portion 5*b* and the inner ring bracket 8. Therefore, the overlap portion 5*b* can be clamped between the set of inner and outer ring brackets 8, 11, so that yield of products can be improved.

The bracket hold unit 31 is arranged between the forming unit 34 and the second hold unit 26 above the base frame 21. The bracket hold unit 31 is linked to a later-described rod 29 of the transfer unit 30. The bracket hold unit 31 has a cylindrical receiving portion 32 receiving the outer bracket 11 and a cylindrical passing portion 33 having a smaller inner diameter than an inner diameter of the receiving portion 32 and an outer diameter of the outer ring bracket 11. The receiving portion 32 and the passing portion 33 are connected to each other in order along the lengthwise of the base frame 21. The receiving portion 32 is located apart from the second hold unit 26 more than the passing portion 33. An inner space of the receiving portion 32 communicates to an inner space of the passing portion 33. A center axis of the receiving portion 32 and a center axis of the passing portion 33 correspond to the center axis of the electric wire 2 held by the first hold unit 50 and the second hold unit 26, that is coaxial to each other.

Such bracket hold unit 31 positions the outer ring bracket 11 in the receiving portion 32, and an end surface of the passing portion 33 limits the outer ring bracket 11 not to be displaced apart from the forming unit 34, so that the outer ring bracket 11 is held so as to position the braid 5 held in the outer ring bracket 11 by the first hold unit 50 and the second hold unit 26.

The transfer unit 30 is arranged above the other end in the lengthwise direction of the base frame 21. The transfer unit 30 includes a column 27 extending vertically from the base frame 21, a cylinder main body 28 fixed through the column 27 at the base frame 21, and a rod 29 extendable from the cylinder main body 28. The rod 29 is joined with the bracket hold unit 31. A direction of the rod 29 moving back-and-forth against the cylinder main body 28 is in parallel to the lengthwise direction of the braid 5 held by the first hold unit 50 and the second hold unit 26. Therefore, the rod 29 transfers the bracket hold unit 31 along the lengthwise direction of the braid 5.

The transfer unit 30 positions the bracket hold unit 31 at a position, in which the far-side 5*d* to be overlapped of the braid 5 held by the first hold unit 50 and the second hold unit 26 (FIGS. 3, 9) is located in the outer ring brackets 11, until the overlap portion 5*b* is formed by the forming unit 34. When the overlap portion 5*b* is formed, the transfer unit 30 transfers the bracket hold unit 31 to another position, in which the formed overlap portion 5*b* of the braid 5 held by the second hold unit 26 is located in the outer ring bracket 11. Thereby, the outer ring bracket 11 can be positioned around the overlap portion 5*b* so as not to be deformed the shape of the overlap portion 5*b*.

According to the present invention, the apparatus 20 for processing terminal treatment of braid includes the forming unit 34, which has the plurality of outer forming pieces 35, 37, the drive unit moving the pair of outer forming pieces 35, 37 close to and apart from each other in the radial direction of the electric wire 2, the plurality of inner forming pieces 39, 40, and the support unit 41, 42 supporting the plurality of inner forming pieces 39, 40 movably in the radial direction and the lengthwise direction of the electric wire 2. The outer forming pieces 35, 37 and the inner forming pieces 39, 40 can be moved apart from the overlap portion 5*b*, so that it can be prevented from obstructing motion of the push unit 55 and the bracket hold unit 31 by them. Thereby, keeping the braid 5 at the first hold unit 50 and the second hold unit 26, the series of processing terminal treatment can be acted continuously. Then, a tact time for processing can be shortened so that efficiency of processing terminal treatment can be more improved. Also, the apparatus for processing terminal treatment of braid with a small occupation space can be provided.

According to the present invention, the apparatus 20 for processing terminal treatment of braid further includes the bracket hold unit 31, and the transfer unit 31 transferring the bracket hold unit 31 along the lengthwise direction of the base frame 21. Thereby, the tact time of processing can be shortened so that the efficiency of processing terminal treatment of braid can be more improved.

The control unit is a computer having a RAM, a ROM and a CPU, and connected with the first hold unit 50, the second hold unit, the push unit 55, the forming unit 34 and the transfer unit 30 for controlling totally the apparatus 20 for processing terminal treatment of braid.

The crimping device, as shown in FIG. 12, includes a crimping die set 60 for crimping the outer ring bracket 11 so as to position the outer ring bracket 11 around the overlap portion 5*b* and decrease the diameter of the outer ring bracket 11. The crimping device 60 is provided on a surface thereof with a projection 61 for forming projections 11*a*. When the outer ring bracket 11 will be crimped, the small diameter portion 92 of the inner ring bracket 8 is inserted into the overlap portion 5*b*, and a member for preventing over displacement is inserted into the small diameter portion 92.

A method for processing terminal treatment, i.e. processing for assembling the set of inner and outer ring brackets 8, 11 at the overlap portion 5*b* of the braid 5 by using the apparatus 20 for processing terminal treatment of braid mentioned above, will be described.

First, the step is a process for removing the sheath 6 at the end 1*a* of the shield wire 1. Next, the step proceeds to a process of winding an adhesive tape 7 around the top 5*a* of braid 5.

As shown in FIG. 4, the step proceeds to a process for fitting the outer ring bracket 11 in the bracket hold unit 31 of the apparatus 20 for processing terminal treatment of braid. The next step proceeds to a process for passing the braid 5 covering the electric wires 2 through the outer ring bracket 11, holding the top 5*a* by the first hold unit 50 and holding the far-side 5*d* by the second hold unit 26.

Next, the apparatus 20 is acted, so that by the control unit, the rod 54 of the push unit 55 extends and the wire receiving pipe 53 moves toward the second hold unit 26, as shown FIGS. 5, 6. Thereby, the top 5*a* is pushed toward the far-side 5*d* so as to fold the braid 5 to form the overlap portion 5*b*. At the time, a part of an outer surface of the overlap portion 5*b* abuts on the inner surface of the pair of outer forming pieces 35, 37 (the outer forming die 43) of the forming unit 34 so as to fold a part of the overlap portion 5*b* toward the far-side in the lengthwise direction of the shield wire 1, so that the folding line 5*c* is formed.

The control unit removes the moving member 52 from the fixed member 51, and releases holding of the top 5*a* by the first hold unit 50, and shortens the rod 54 of the push unit 55 so as to move the wire receiving pipe 53 apart from the second hold unit 26, as shown in FIG. 7.

The control unit moves the pair of inner form pieces 39, 40 joined to each other (the inner forming die 44) into the pair of outer form pieces 35, 37 joined to each other (the outer forming die 43) by the support unit 41, 42 of the forming unit 34 so as to push the overlap portion 5*b* to the inner surface of the pair of outer form pieces 35, 37 (the outer forming die 43). Thereby, the overlap portion 5*b* is formed into the cone shape, in which the top 5*a* is located.

The control unit moves the pair of inner form pieces 39, 40 and the pair of outer form pieces 35, 37 apart from the overlap portion 5*b* by the support unit 41, 42 and the drive unit, as shown in FIG. 9. Thereafter, the control unit makes the rod 29 extend so as to move the bracket hold unit 31 holding the outer ring bracket 11 to the position in which the overlap portion 5*b* is positioned in the outer ring bracket 11, as shown in FIG. 10.

Next, the shield wire 1, the overlap portion 5*b* of which is formed as mentioned above, is removed from the apparatus 20 for processing terminal treatment of braid as shown in FIG. 11. The small diameter portion 9*s* of the inner ring bracket 8 is inserted into the overlap portion 5*b*, and the member for preventing over displacement is inserted into the small diameter portion 92, as shown in FIG. 12. The set of inner and outer ring brackets 8, 11 is positioned against the overlap portion 5*b* to each other, and placed in a crimping die set 60 of the crimping device. The outer ring bracket 11 is crimped by the crimping die set 60 so as to clamp the overlap portion 5*b* between the set of inner and outer ring brackets 8, 11. Thus, the set of inner and outer ring brackets 8, 11 is attached at the overlap portion 5*b*, and the shield wire 1 as shown in FIGS. 1, 2 is provided.

In the above embodiment, the top 5*a* of the braid 5 is pushed toward the far-side 5*d* so as to form the overlap portion 5*b*. According to the present invention, the far-side 5*d* can be pushed toward the top 5*a* so as to form the overlap portion 5*b*. The top 5*a* and the far-side 5*d*, both can be approached to each other so as to form the overlap portion 5*b*.

While, in the embodiment, the present invention is described, it is not limited thereto. Various change and modifications can be made with the scope of the present invention.

The invention claimed is:

1. An apparatus for processing terminal treatment of a braid of a shield wire, comprising:

a first hold unit holding a top of the braid covering an electric wire;

a second hold unit holding a far-side of the braid opposite the top of the braid to be overlapped;

a push unit pushing the top of the braid toward the far-side of the braid so as to fold the top into the braid itself to form an overlap portion; and a forming unit forming the overlap portion approximately into a cone shape in which the top is located, wherein the forming unit comprises:

a plurality of outer forming pieces structuring an outer forming die having a truncated cone shape of a decreasing inner diameter along a direction from the top toward the far-side of the braid for positioning the overlap portion in the outer forming die, a drive unit moving the plurality of outer forming pieces close to and apart from each other in a radial direction perpendicular to the direction from the top toward the far-side of the braid, a plurality of inner forming pieces structuring an inner forming die pressing the overlap portion against an inner surface of the outer forming die, and a support unit supporting the plurality of inner forming pieces movably in the radial direction and the direction from the top toward the far-side of the braid.

2. An apparatus for processing terminal treatment of a braid of a shield wire comprising:

a first hold unit holding a top of the braid covering an electric wire, a second hold unit holding a far-side of the braid opposite the top of the braid to be overlapped, a push unit pushing the top of the braid toward the far-side of the braid so as to fold the top into the braid itself to form an overlap portion, and a forming unit forming the overlap portion approximately into a cone shape in which the top is located;

a bracket hold unit supporting movably an outer metal ring bracket of a set of inner and outer metal ring brackets between a position, in which the far-side of the braid held by the first hold unit and the second hold unit is located in the outer metal ring bracket, and another position, in which the overlap portion held by the second hold unit is located in the outer metal ring bracket; and a transfer unit positioning the bracket hold unit at the position until the overlap portion is formed securely, and after the overlap portion is formed, transferring the bracket hold unit at the another position.

3. The apparatus for processing terminal treatment of braid of a shield wire according to claim 1, further comprising:

a bracket hold unit supporting movably an outer metal ring bracket of a set of inner and outer metal ring brackets between a position, in which the far-side of the braid held by the first hold unit and the second hold unit is located in the outer metal ring bracket, and another position, in which the overlap portion held by the second hold unit is located in the outer metal ring bracket; and a transfer unit positioning the bracket hold unit at the position until the overlap portion is formed securely, and after the overlap portion is formed, transferring the bracket hold unit at the another position.

* * * * *